(12) United States Patent
Swenson

(10) Patent No.: US 8,819,721 B2
(45) Date of Patent: Aug. 26, 2014

(54) SYSTEM AND METHOD FOR CONTROLLING ACCESS TO VIDEO EVENTS ASSOCIATED WITH VIDEO BROADCAST SERVICES

(75) Inventor: Erik Swenson, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 851 days.

(21) Appl. No.: 12/240,600

(22) Filed: Sep. 29, 2008

(65) Prior Publication Data

US 2010/0083301 A1    Apr. 1, 2010

(51) Int. Cl.
*H04N 7/16* (2011.01)
*H04N 7/167* (2011.01)
*G06F 13/00* (2006.01)
*H04N 5/44* (2011.01)

(52) U.S. Cl.
USPC ................................. 725/29; 725/25; 725/28

(58) Field of Classification Search
CPC .................... H04N 21/25841; H04N 21/2541; H04N 21/2668
USPC .............................................. 725/25–32, 97
See application file for complete search history.

(56) References Cited

U.S. PATENT DOCUMENTS

| | | | |
|---|---|---|---|
| 6,005,562 A | | 12/1999 | Shiga et al. |
| 6,108,365 A | * | 8/2000 | Rubin et al. ................... 375/130 |
| 7,073,189 B2 | * | 7/2006 | McElhatten et al. ............. 725/58 |
| 2006/0107285 A1 | * | 5/2006 | Medvinsky ....................... 725/25 |
| 2007/0173325 A1 | * | 7/2007 | Shaw et al. ....................... 463/42 |
| 2007/0214484 A1 | * | 9/2007 | Taylor et al. ................... 725/100 |
| 2008/0163304 A1 | | 7/2008 | Ellis |
| 2008/0168487 A1 | * | 7/2008 | Chow et al. ...................... 725/31 |
| 2008/0256569 A1 | * | 10/2008 | Rhoades et al. ................. 725/25 |
| 2009/0178074 A1 | * | 7/2009 | Ellis .................................. 725/28 |
| 2009/0235315 A1 | | 9/2009 | Sharkey et al. |
| 2010/0115544 A1 | | 5/2010 | Swenson |

OTHER PUBLICATIONS

European Telecommunications Standards Institute and European Broadcasting Union "Digital Video Broadcasting (DVB); Specification for Service Information (SI) in DVB Systems," ETSI EN 300 468 v1.7.1, May 2006.
United States Patent and Trademark Office, Office Action for U.S. Appl. No. 12/263,585, dated May 24, 2012.
USPTO "Final Office Action" mailed Jan. 19, 2012; U.S. Appl. No. 12/263,585, filed Nov. 3, 2008.
USPTO "Non-Final Office Action" mailed May 11, 2011; U.S. Appl. No. 12/263,585, filed Nov. 3, 2008.

* cited by examiner

*Primary Examiner* — Pankaj Kumar
*Assistant Examiner* — Reuben M Brown
(74) *Attorney, Agent, or Firm* — Ingrassia Fisher & Lorenz, P.C.

(57) ABSTRACT

The video services receiver system and related operating methods disclosed herein enable better management of blackout information for events associated with a broadcast service, such as a satellite television service. A system for providing video content to a display for viewing by a customer includes a receiver interface configured to receive data associated with a service, a display interface for the display, at least one memory element configured to store dated blackout information for events on the service, and to store frequently updated blackout information for events on the service, and a processor coupled to the receiver interface, the display interface, and the at least one memory element. The processor is configured to control access to a current event on the service by analyzing both the dated blackout information and the frequently updated blackout information. The processor is configured to present video content associated with the current event if access is granted.

5 Claims, 5 Drawing Sheets

SYSTEM AND METHOD FOR CONTROLLING ACCESS TO VIDEO EVENTS ASSOCIATED WITH VIDEO BROADCAST SERVICES

TECHNICAL FIELD

Embodiments of the subject matter described herein relate generally to digital video systems such as satellite video systems. More particularly, embodiments of the subject matter relate to controlling customer access to video events using blackout information associated with the video events.

BACKGROUND

Most television viewers now receive their video signals through a content aggregator such as a cable or satellite television provider. In the typical instance, encoded television signals are sent via a cable or wireless data link to the viewer's home, where the signals are ultimately decoded in a set-top box or other consumer device. The decoded signals can then be viewed on a television or other appropriate display as desired by the viewer.

Digital video broadcasting (DVB) systems, such as satellite systems, are generally known. The terms "service" and "event" are often used when referring to video programming delivered via a satellite system. In this context, a "service" represents a sequence of programs under the control of a broadcaster (or service provider), where a "service" can be broadcast in accordance with a predetermined schedule, and an "event" represents a grouping of elementary broadcast data streams having a defined start time and a defined end time belonging to a common service. In this regard, a "service" is akin to a traditional television broadcast channel, and an "event" is akin to a scheduled television show broadcast on a television channel.

DVB systems are often used to broadcast live events such as sporting events, concerts, fundraisers, ceremonies, speeches, and the like. A sporting event (and other events) can be subjected to blackout rules such that viewers in certain geographical regions are denied access to the event, while viewers in other geographical regions are allowed to view the event. For example, a viewer in Denver, Colo. may be authorized to view a live broadcast of a Los Angeles Lakers basketball game, while viewers in Los Angeles, Calif. may be denied access to that game. Conversely, viewers in Denver may be subjected to a blackout for a Denver Nuggets basketball game, while viewers in Los Angeles may be permitted to watch that game. Satellite systems have traditionally employed blackout data to control access to events that are subjected to blackout rules. Blackout data is processed by the customer's set-top box, which determines whether or not the customer has access rights to view certain events.

Conventional satellite systems handle back-to-back sporting events in a manner that can lead to inconsistent behavior (from the customer perspective), and customer confusion. When back-to-back sporting events are scheduled, blackout data is applied to the first game, but not immediately to the second game. In other words, the intended blackout rules will only be applied to the first game (resulting in authorized access to the first game by some viewers, and denied access to the first game by other viewers); the blackout rules for the second game will be temporarily disabled or ineffective during the first game. An operator, who monitors the progress of the first game, applies the blackout data to the second game after confirming that the first game has ended. Such real-time monitoring of the first game is utilized so that customers watching the first game will be able to view the entire game, even if it goes into overtime. Otherwise, prescheduled blackout data may cause the first game to be blacked out as of the scheduled start time of the second game.

Real-time updating of blackout data for back-to-back events is traditionally accomplished by changing blackout designators in the service information (SI) of the satellite system. The SI represents system-wide and global data because the same SI is transmitted from the uplink facility to all of the satellites in the system, and from every transponder in each satellite to all of the set-top boxes in the system. Moreover, the SI includes a relatively large amount of data (approximately 40 megabytes), which requires lots of time to spool and transmit on a system-wide scale. In this regard, updating the SI at a set-top box is typically delayed by about twenty minutes. In other words, a real-time change to the blackout data (e.g., in response to the end of an overtime game) will not be effective in the set-top box for at least twenty minutes.

The latency associated with the updating of blackout data in the SI, and the traditional approach for handling blackout data can be the source of confusion at the customer end. For example, even though the second game should be blacked out for the customer, the traditional approach will not apply the blackout data to the second game until the first game is completed. Accordingly, the customer's program guide will temporarily list the second game as though the customer has access to the second game when in fact he does not. This can mislead the customer into believing that he will be able to watch the second game following the first game. In addition, this behavior could allow the customer to set a timer for the second game when in reality that game will be blacked out. As another example of inconsistent behavior, the latency associated with the updating of the SI-based blackout data will allow the customer (who should be blacked out for the second game) to view a portion of the second game—more or less depending upon the actual time delay involved. After the blackout on the second game becomes effective, the customer may be tempted to call the service provider for an explanation of the unusual system behavior.

BRIEF SUMMARY

The techniques and systems described herein alleviate the shortcomings of the prior art by providing a mechanism by which blackout information for video events can be updated and processed with very low latency, relative to conventional methodologies. Quick updating of blackout information at a set-top box of a satellite system is particularly desirable when live back-to-back events are involved.

A method of controlling access to events by a customer associated with a video services receiver is provided. The video services receiver is configured to receive video content and to provide the video content to the customer on a display. The method involves: identifying a current event on a service; analyzing service-specific blackout information for the current event; granting access to the current event if the service-specific blackout information authorizes access; and denying access to the current event if the service-specific blackout information prohibits access.

The above and other aspects may be carried out by an embodiment of a satellite video services receiver that is configured to receive video content and to control access to the video content. The satellite video services receiver supports a method of managing blackouts for events on a service for a customer. The method involves the steps of maintaining system-wide blackout information for events on the service, maintaining service-specific blackout information for events on the service, and processing an access request for a current event on the service. The method grants access to the current event if the system-wide blackout information authorizes access, and checks a join-in-progress indicator for the current event if the system-wide blackout information indicates a blackout for the current event. The method denies access to the current event if the join-in-progress indicator is in a first state, analyzes the service-specific blackout information if the join-in-progress indicator is in a second state, and controls access to the current event in response to analyzing the service-specific blackout information.

An embodiment of a video services receiver system is also provided. The system presents video content to a display for viewing by a customer. The system includes a receiver interface configured to receive data associated with a service, a display interface for the display, at least one memory element configured to store dated blackout information for events on the service, and to store frequently updated blackout information for events on the service, and a processor coupled to the receiver interface, the display interface, and the at least one memory element. The processor is configured to control access to a current event on the service by analyzing both the dated blackout information and the frequently updated blackout information. The processor is also configured to present video content associated with the current event if access is granted.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown in the figures might depict exemplary arrangements of elements, additional intervening elements, devices, features, or components may be present in an embodiment of the depicted subject matter.

The techniques and technology described herein can be employed in the context of a video delivery system such as a satellite television system. The disclosed subject matter relates to the broadcasting of video events that might be subjected to blackouts, i.e., certain customers/subscribers will not be allowed to view a blacked out event. More specifically, the disclosed subject matter relates to the processing of blackout data and information in an improved manner that provides a better end user experience.

Figure 1:
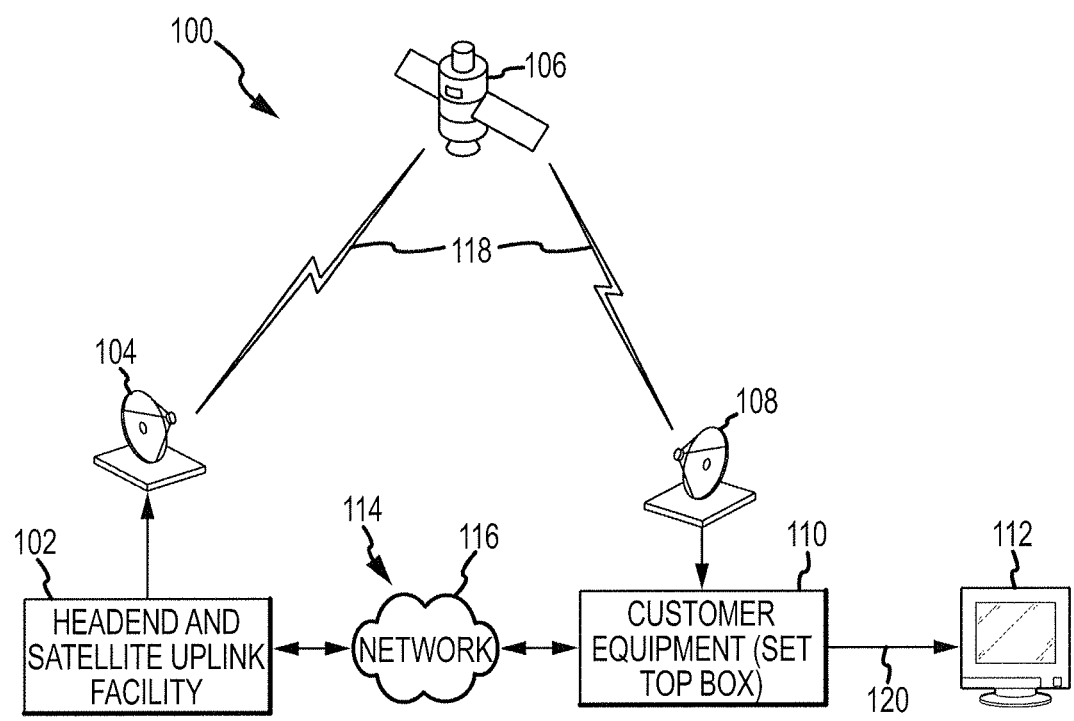
FIG. 1 is a schematic representation of an embodiment of a video services broadcasting system.

FIG. 1 is a schematic representation of an embodiment of a video services broadcasting system 100 that is suitably configured to support the improved event blackout management techniques described below. System 100 (which has been simplified for purposes of illustration) generally includes, without limitation: a data center 102; an uplink transmit antenna 104; a satellite 106; a downlink receive antenna 108; a video services receiver 110 or other customer equipment; and a display device 112. In certain embodiments, data center 102 communicates with video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

Data center 102 may be deployed as a headend facility and/or a satellite uplink facility for system 100. Data center 102 generally functions to control content and data sent over a high-bandwidth link 118 to any number of downlink receive components (only one downlink receive antenna 108, corresponding to one customer, is shown in FIG. 1). In the embodiment shown in FIG. 1, high-bandwidth link 118 is a direct broadcast satellite (DBS) link that is relayed by satellite 106, although equivalent embodiments could implement high-bandwidth link 118 as any sort of cable, terrestrial wireless and/or other communication link as desired.

Data center 102 includes one or more conventional data processing systems or architectures that are capable of producing signals that are transmitted via high-bandwidth link 118. In various embodiments, data center 102 represents a satellite or other content distribution center having: a data control system for controlling content, signaling information, blackout information, and other data; and an uplink control system for transmitting content, signaling information, blackout information, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on high-bandwidth link 118 in any manner. In the exemplary embodiment illustrated in FIG. 1, uplink transmit antenna 104 is able to transmit data to satellite 106, which in turn uses an appropriate transponder for repeated transmission to downlink receive antenna 108. Additional features and functions of data center 102 and the uplink control system used by system 100 are described below with reference to FIG. 2.

Under normal operating conditions, satellite 106 transmits content, signaling data, blackout information, and other data to downlink receive antenna 108, using high-bandwidth link 118. In practical embodiments, downlink receive antenna 108 represents the customer's satellite dish, which is coupled to video services receiver 110. Video services receiver 110 can be realized as any device, system or logic capable of receiving signals via high-bandwidth link 118 and downlink receive antenna 108, and capable of providing demodulated content to a customer via display device 112. Display device 112 may be, without limitation: a television set; a monitor; a computer display; or any suitable customer appliance with compatible display capabilities. In various embodiments, video services receiver 110 is a conventional set-top box commonly used with DBS or cable television distribution systems. In other embodiments, however, the functionality of video services receiver 110 may be commonly housed within display device 112 itself. In still other embodiments, video services receiver 110 is a portable device that may be transportable with or without display device 112. Video services receiver 110 may also be suitably configured to support broadcast television reception, video game playing, personal video recording and/or other features as desired.

During typical operation, video services receiver 110 receives programming (broadcast events), signaling information, and/or other data via high-bandwidth link 118. Video services receiver 110 then demodulates, decompresses, descrambles, and/or otherwise processes the received digital data, and then converts the received data to suitably formatted video signals 120 that can be rendered for viewing by the customer on display device 112. Additional features and functions of video services receiver 110 are described below with reference to FIG. 3.

Figure 2:
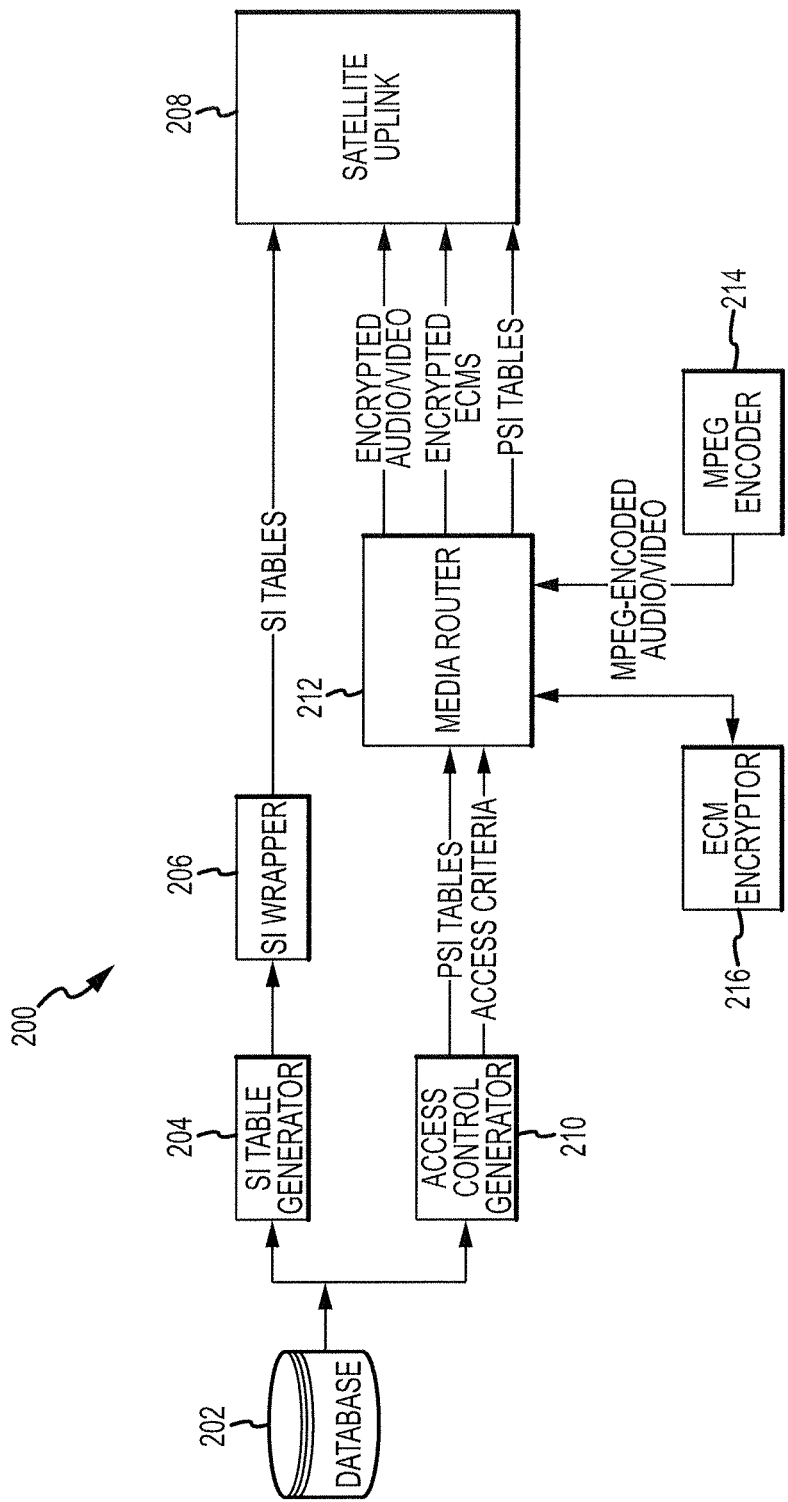
FIG. 2 is a schematic representation of uplink facility equipment suitable for use in the video services broadcasting system shown in FIG. 1.

FIG. 2 is a schematic representation of uplink facility equipment 200 suitable for use in video services broadcasting system 100. Equipment 200 may be realized with any number of hardware, software, firmware, and/or logical processing elements located at, for example, data center 102. The illustrated embodiment includes, without limitation: a database 202; a service information (SI) table generator 204; an SI wrapper component 206; a satellite uplink component 208; an access control generator 210; and a media router 212. These components and elements (and possibly other components) can be coupled together as shown or in any suitable manner to support the transport of data, signaling information, control signals, and commands as needed.

Database 202, which may be implemented as an Information Management System (IMS) database, contains data associated with the services and events broadcast by the system. For this embodiment, database 202 contains data associated with broadcast services, programming, event schedules, access criteria, blackout categories, and the like. The data maintained in database 202 is updated as needed to reflect any changes in the services, events, programming, access criteria, blackout information, and the like. In this regard, certain aspects of system 100 and uplink facility equipment 200 may be consistent with, compliant with, or similar to that described in the document titled "Digital Video Broadcasting (DVB); Specification for Service Information (SI) in DVB Systems," ETSI EN 300 468 V1.7.1, published May 2006 by European Telecommunications Standards Institute (this document is hereinafter referred to as the "DVB Specification"). The relevant content of the DVB Specification is incorporated by reference herein.

SI table generator 204 prepares SI tables (also referred to herein simply as "SI") that convey system-wide information that is sent throughout the system. The SI is "global" in nature in that the same SI is transmitted from the uplink facility to the satellites, and from the satellites to all of the set-top boxes in the system. Thus, the same SI is made available on every transponder in the system. SI wrapper component 206 represents a data spooler that prepares the SI for transmission by satellite uplink component 208. In practice, SI wrapper component 206 can be suitably configured to spool the SI in a continuous or substantially continuous manner such that the SI in the set-top boxes can be updated as frequently as possible.

According to the DVB Specification, SI is "digital data describing the delivery system, content, and scheduling/timing of broadcast data streams, etc." The SI referred to herein generally comports with the definition provided in the DVB Specification. For example, the SI includes at least the following tables: Network Information Table (NIT); Service Description Table (SDT); and Event Information Table (EIT). During operation, a set-top box will process SI to identify/locate a service (i.e., which satellite, which transponder on that satellite, etc.), to determine whether it can tune to that service, and to determine which events/programs are available now and in the future. The SI represents a relatively large amount of data (e.g., about 40 megabytes) and, therefore, it takes a long time to update the SI, and it takes a long time to transmit the SI to a set-top box.

The NIT includes information about where satellites are located in the sky, the encoding and broadcast parameters utilized by the transponders (e.g., polarization, modulation, etc.), and the particular services associated with each transponder. The SDT includes information about specific services, the associated service identifiers (channel numbers), whether or not any service-level blackouts are applied (if necessary), the name of each service, and the type of video/audio stream associated with each service (e.g., MPEG2 SD, MPEG2 Audio, MPEG4, etc.). The EIT includes information about specific events. For example, the EIT includes, for each event: the event name; an event description; ratings; event-level blackout information (if necessary); and which rights give access to that event (if necessary).

For the embodiments described here, the SI conveys blackout information in a blackout descriptor. The blackout information contained in the SI is referred to herein as "system-wide blackout information." A blackout descriptor could be conveyed in the SDT and/or in the EIT—if conveyed in both, the blackout descriptor in the EIT will override the blackout descriptor in the SDT. In preferred embodiments, the blackout descriptor is conveyed in the EIT and, optionally, in the SDT. The blackout descriptor includes category and subcategory data corresponding to blackout criteria; the category and subcategory data can be processed to determine whether or not a particular set-top box will be subjected to a blackout for a given event. In practice, the category and subcategory data may correspond to relatively large geographic regions and relatively narrow geographic regions, respectively. For example, a blackout category may identify a state or a county, while a corresponding blackout subcategory may identify a specific zip code or area code within that state or county. Thus, a set-top box can process the category and subcategory data to determine whether or not it can access an event to which a blackout is applied.

Notably, the blackout descriptor (or any other portion of the SI) may also include a join-in-progress indicator, flag, bit, or field. The join-in-progress indicator is utilized for back-to-back events where the exact end time of the first event is unknown and, therefore, where it may be necessary to dynamically adjust the blackout timing for the events. Although the join-in-progress indicator could be utilized for any event subject to blackouts, the following description assumes that the join-in-progress indicator is only used for back-to-back events where the actual end time of the first event may extend beyond the scheduled start time of the second event. For example, if back-to-back sporting events are scheduled, the first sporting event may go into overtime (for a basketball, football, or hockey game), have extra innings (for a baseball game), or otherwise have an uncertain end time (for a tennis match or a golf tournament).

As described in more detail below, the set-top box will check the status of the join-in-progress indicator to determine whether or not it might be able to join the particular event while it is in progress. The embodiment described here employs a one-bit flag for the join-in-progress indicator: if the flag is set, then the set-top box can attempt to join a current event in progress; if the flag is not set, then the set-top box cannot attempt to join the current event in progress. For a back-to-back game scenario, the second of the back-to-back games shall have an associated join-in-progress indicator. Thus, the blackout descriptor preferably includes a join-in-progress indicator for each trailing event of a pair of back-to-back events, and the status of the join-in-progress indicator on the second event will be set and configured as needed for compatibility with the desired blackout information. For example, if a customer is blacked out for the second event and the join-in-progress indicator is set for that second event, then the join-in-progress indicator will indicate that the customer can attempt to tune to the second event despite the fact that the blackout descriptor indicates that the customer should be blacked out. If the customer is not blacked out for the second event, then the join-in-progress indicator will be ignored and the set-top box will allow the customer to tune to the event in progress.

Referring again to FIG. 2, access control generator 210 prepares Program Specific Information tables (also referred to herein simply as "PSI") and access criteria associated with events and programming. The PSI and access criteria is generated on a transponder-specific basis. In other words, access control generator 210 generates respective PSI and access criteria for each transponder in the system. As depicted in FIG. 2, access control generator 210 sends the PSI and access criteria to media router 212 for processing. In a practical embodiment, access control generator 210 communicates with a plurality of media routers (where uplink facility equipment 200 has one media router 212 per transponder). Access control generator 210 can update the PSI and access criteria for a given transponder quickly and frequently, because the data is specific to only one transponder and because the data need not be transmitted globally throughout the entire system. The PSI represents a relatively small amount of data (compared to the SI); for example, the PSI may utilize only one to three kilobytes of data.

Generally, the PSI represents a transport-by-transport mechanism that enables a set-top box to tune to a service. The PSI contains information that a set-top box uses to navigate to a service once it has already tuned to a particular transponder. The PSI includes the information necessary to find the particular audio, video, and other program-related data. For the embodiment described here, the PSI primarily includes at least the following tables: Program Acquisition Table (PAT); Program Map Table (PMT); and Conditional Access Table (CAT). The PAT indicates the packet identifier (PID) corresponding to the PMT for a particular service. The PAT may be redundant or optional for certain system embodiments, for example, in systems where all services are found in the same PMT. The PMT indicates the PIDs corresponding to the audio data, video data, and entitlement control messages (ECMs) for a particular service (ECMs are described in more detail below). The CAT indicates the PID corresponding to entitlement management messages (EMMs) for the service, where an EMM is a subscriber-specific message that conveys any changes to the subscriber's access rights, time zone, zip code, etc. Notably, although the PSI does not actually contain the audio, video, or ECM data for a service, those items are referenced in the PSI using various PIDs.

The access control generator 210 provisions media router 212 with access control data (also referred to as access criteria). This set of data includes authorization information and blackout information. The media router 212 combines the access control data with a cryptographic key which has been used to encipher the video data.

As illustrated in FIG. 2, media router 212 obtains the PSI tables and the access criteria for processing and handling. The system embodiment described here utilizes one media router 212 per transponder (FIG. 2 only depicts one media router 212 for clarity and ease of illustration). Media router 212 generally functions to prepare encrypted audio and video data, ECMs, and PSI, and to send that information to satellite uplink component 208. In this regard, media router 212 may cooperate with an MPEG encoder 214 that is suitably configured to generate MPEG-encoded audio and video data associated with the services supported by the particular transponder. Media router 212 can then encrypt (scramble) the MPEG-encoded audio/video data as needed using an appropriate encryption scheme.

Media router 212 processes the access criteria obtained from access control generator 210, and creates ECMs (one ECM per service) based upon the access criteria. An ECM conveys a control word or data that functions as a decryption or descrambling key for the set-top box. The set-top box utilizes this key to decrypt audio/video data to which it has legitimate access. In certain embodiments, the control word changes frequently to provide additional security (e.g., once every fifteen seconds), and an ECM can be updated very quickly due to its small size. For example, a typical ECM will have a size of about two hundred bytes, thus allowing it to be transmitted from satellite uplink component 208, to a satellite, and down to the set-top box in seconds.

For the embodiment described here, the ECM also conveys information about which rights must be present and valid on the set-top box (more particularly, on the security module of the set-top box) for granting access to the service. Moreover, the ECM also conveys blackout information that dictates whether or not the set-top box will disallow viewing of the service or specified events on the service. As used herein, blackout information, blackout data, and blackout criteria included in, conveyed by, or otherwise associated with an ECM is referred to as "service-specific" blackout information, and such service-specific blackout information is distinguishable and distinct from system-wide blackout information that is conveyed in the SI.

The ECM itself is encrypted or scrambled before being transmitted by satellite uplink component 208. Accordingly, equipment 200 may include or cooperate with a suitably configured ECM encryptor 216 that encrypts the ECMs generated by media router 212 (alternatively, the functionality of ECM encryptor 216 may be integrated into media router 212). ECM encryptor 216 receives unencrypted ECMs from media router 212, encrypts the ECMs using an appropriate encryption scheme or algorithm, and returns the encrypted ECMs to media router 212. Thus, the set-top box must be able to decrypt the received ECM before it can access the control word and other data conveyed in the ECM.

Media router 212 provides the encrypted audio/video data, the encrypted ECMs, and the PSI to satellite uplink component 208, and SI wrapper component 206 provides the SI to satellite uplink component 208. Notably, the SI, PSI, and ECM represent distinct and separate data constructs that are generated and transmitted independently and separately, even though some data, such as blackout information, may be common or redundant. Again, although SI wrapper component 206 strives to continuously spool the SI tables out for transmission to the set-top boxes, the overall SI updating process can take many minutes to complete, due to the large amount of SI data and due to the system-wide nature of the SI. In contrast, the ECM can be updated very quickly and in substantially real-time due to its small size and due to its service-specific nature.

Figure 3:
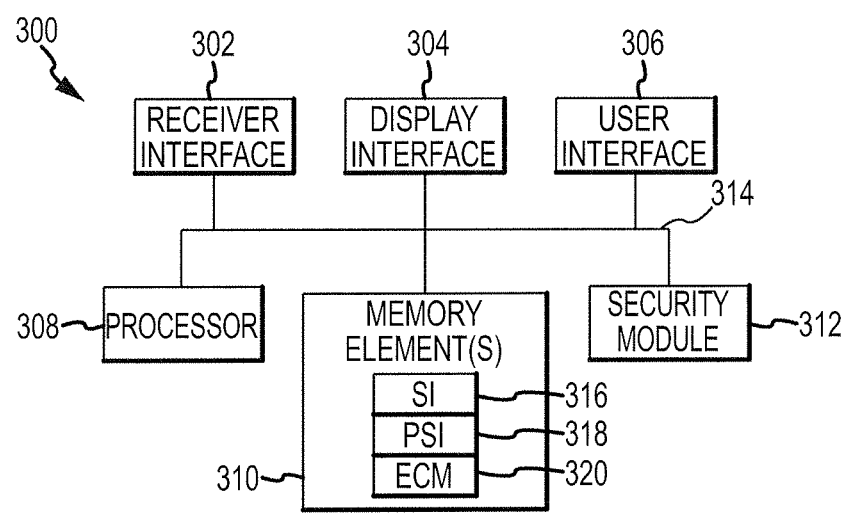
FIG. 3 is a schematic representation of an embodiment of a set-top box suitable for use in the video services broadcasting system shown in FIG. 1.

Referring again to FIG. 1, the encrypted audio/video data, the SI, the encrypted ECMs, and the PSI is transmitted to video services receiver 110, via satellite 106. Video services receiver 110 can then process the received data in an appropriate manner. Referring now to FIG. 3, a schematic representation of an embodiment of a set-top box 300 suitable for use in video services broadcasting system 100 is depicted. Set-top box 300 is configured to receive video content, and to provide the video content to the customer on an appropriate display. This embodiment of set-top box 300 generally includes, without limitation: a receiver interface 302; a display interface 304 for the display; a user interface 306; at least one processor 308; at least one memory element 310; and a security module 312. These components and elements may be coupled together as needed for purposes of interaction and communication using, for example, an appropriate interconnect arrangement or architecture 316. In practice, set-top box 300 will include additional elements and features that support conventional functions and operations.

Receiver interface 302 is coupled to the customer's satellite antenna, and receiver interface 302 is suitably configured to receive and perform front end processing on signals transmitted by satellite transponders. In this regard, receiver interface 302 can receive data associated with any number of services. Receiver interface 302 may leverage conventional design concepts that need not be described in detail here. Display interface 304 is coupled to one or more display elements (not shown) at the customer site. Display interface 304 represents the hardware, software, firmware, and processing logic that is utilized to render graphics, images, video, and other visual indicia on the customer's display. Display interface 304 may leverage conventional design concepts that need not be described in detail here. User interface 306 may include one or more elements, components, or features that accommodate user inputs and/or that provide feedback to the user. For example, user interface 306 may include, without limitation: keys; buttons; switches; a keyboard; a touchpad; a touch screen; a mouse or equivalent pointing device; indicator lights; or the like.

The customer display element can be any television, monitor, or appliance capable of displaying imagery for viewing by one or more customers. In many embodiments, set-top box 300 is able to generate on-screen displays such as windows, menus, graphical user interface (GUI) features, and/or the like on the display element as desired. For example, set-top box 300 may be suitably configured to generate pop-up notifications or windows that indicate whether the customer has access to a selected event and/or whether a selected event is blacked out. Set-top box 300 may also be configured to generate graphical program listings and/or graphical timer schedules that convey blackout information, access notifications, or the like.

Processor 308 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, processor 308 may be realized as a microprocessor, a controller, a microcontroller, or a state machine. Moreover, processor 308 may be implemented as a combination of computing devices, e.g., a combination of a digital signal processor and a microprocessor, a plurality of microprocessors, one or more microprocessors in conjunction with a digital signal processor core, or any other such configuration. As described in more detail below, processor 308 may be adapted to control access to a current event on a service by analyzing both the dated blackout information and the frequently updated blackout information, and to present video content associated with the current event if access is granted.

Memory element 310 may be realized as RAM memory, flash memory, EPROM memory, EEPROM memory, registers, a hard disk, a removable disk, or any other form of storage medium known in the art. In this regard, memory element 310 can be coupled to processor 308 such that processor 308 can read information from, and write information to, memory element 310. In the alternative, memory element 310 may be integral to processor 308. As an example, processor 308 and memory element 310 may reside in a suitably designed ASIC. As depicted in FIG. 3, memory element 310 is preferably configured to store and maintain information, tables, and data received from satellite transponders. For example, memory element 310 can store and maintain the most recent versions of SI table 316, PSI table 318, and ECM data 320 for set-top box 300. More specifically, memory element 310 maintains (by way of SI table 316) system-wide blackout information and join-in-progress indicators for events on a service, and maintains (by way of ECM data 320) service-specific blackout information for events on the service. As mentioned previously, the blackout information contained in SI table 316 is considered to be "dated" blackout information relative to the "frequently updated" blackout information conveyed in ECM data 320.

Security module 312 maintains authorization keys, rights data, blackout criteria (e.g., geographic data such as zip codes) and other information related to access security for set-top box 300. In certain embodiments, security module 312 is realized as a smart card, a portable memory card, or the like, which can be removably installed in set-top box 300. Moreover, security module 312 may include some processing capabilities. As mentioned above, security module 312 may store a decryption key that enables it to decrypt ECMs received by set-top box 300. The decrypted ECM data will contain access criteria that can then be compared against rights information maintained by security module 312. If security module 312 includes the appropriate rights information, then it will provide the necessary video decryption key(s) to set-top box 300, which can then decrypt the scrambled video data using the decryption key(s). On the other hand, if security module 312 does not contain the necessary rights information, then it will deny access to the video data.

Set-top box 300 can tune to a selected service in the following generalized manner. First, set-top box 300 will locate or identify the satellite and transponder that corresponds to the service ID conveyed in the NIT. Set-top box 300 can then locate or identify the desired service in the SDT, locate or identify the desired service in the EIT, and verify that the customer can view that service. If set-top box 300 confirms that the customer can view the service, it will tune to the transponder found in the NIT, acquire the associated PAT, and tune to the PMT referenced in the PAT. Then, set-top box 300 will "listen" for the PIDs for the audio, video, and ECM data, while performing decryption as needed.

Figure 4:
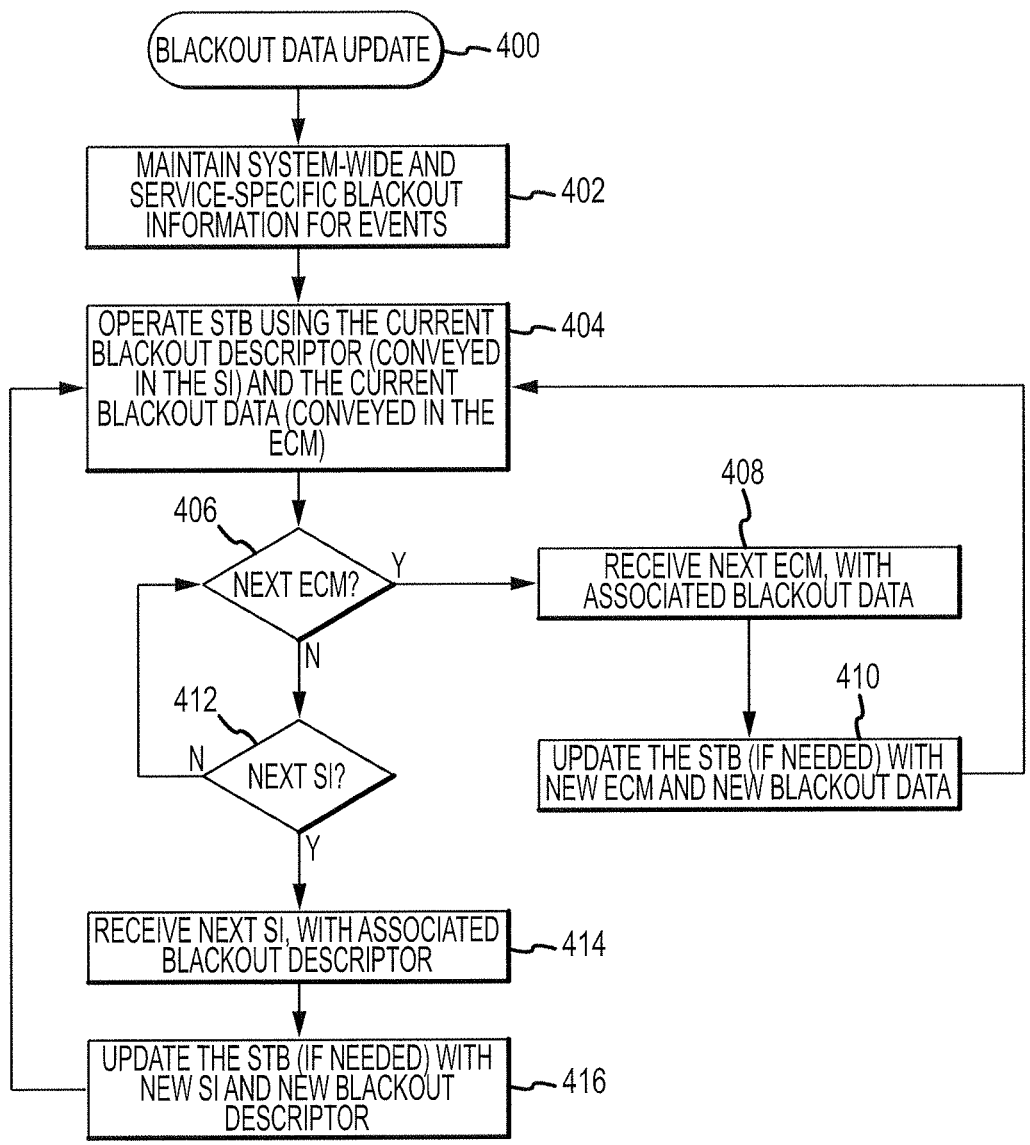
FIG. 4 is a flow diagram of an embodiment of a blackout data update process, which may be performed by a set-top box.

A video services receiver such as set-top box 300 receives downlink signals from satellites in the system, and updates the SI, PSI, and ECM data as needed. In this regard, FIG. 4 is a flow diagram of an embodiment of a blackout data update process 400, which may be performed a video services receiver. The various tasks performed in connection with process 400 may be performed by software, hardware, firmware, or any combination thereof. For illustrative purposes, the following description of process 400 may refer to elements mentioned above in connection with FIGS. 1-3. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

Process 400 maintains system-wide and service-specific blackout information for events on one or more services (task 402). As described above, the system-wide blackout information is conveyed in the SI tables, preferably in the form of blackout descriptors, while the service-specific blackout information is conveyed in the ECMs for the different services. The set-top box (STB) operates using the current blackout descriptors and the current blackout data conveyed in the ECMs (task 404), in the manner described in more detail below. ECMs and SI tables may be updated as frequently as possible in a continuously spooled manner. Accordingly, if the next ECM for a service arrives (query task 406), then process 400 receives the ECM along with its associated blackout data (task 408). In practice, the service-specific blackout information is received at a relatively high update rate, i.e., the ECM data is frequently updated, compared to the SI. In addition, process 400 will update the STB (if needed) with the new ECM data and, in particular, the new service-specific blackout information (task 410). Following task 410, process 400 can be re-entered at task 404 to continue operation of the STB using the updated ECM and the updated service-specific blackout information.

Process 400 also monitors for the next SI (query task 412). If the next SI arrives, then process 400 receives the SI along with its associated blackout descriptor (task 414). In practice, the system-wide blackout information is received at a relatively low update rate, i.e., the SI is not updated very frequently compared to the ECM data. Notably, the STB receives the system-wide blackout information independently and separately from the service-specific blackout information. Moreover, process 400 will update the STB (if needed) with the new SI and, in particular, the new blackout descriptor (task 416). Following task 416, process 400 can be re-entered at task 404 to continue operation of the STB using the updated ECM and the updated service-specific blackout information. The routine followed by process 400 provides updated SI and ECM data to the STB in an ongoing manner. As mentioned above, however, the SI can take a significantly longer amount of time to update (e.g., up to fifteen to twenty minutes), while the ECM can be updated much quicker (e.g., in ten to fifteen seconds).

The improved blackout management technique described here takes advantage of the quick updating of the ECM data, which conveys service-specific blackout information. Operationally, this technique results in blackouts being applied on both back-to-back events in the SI, but only in the ECM for the first event. After completion of the first event, an operator enables the ECM blackout for the second event, and updates the ECM data for that service, which reconciles the SI and ECM access criteria. As a result, users will be able to watch an overtime game (the first event), but the blackout information can be updated very quickly such that customers who ought to be blacked out for the second event will not be mislead into believing that they actually have access rights to the second event. This improves the customer experience by providing a more accurate indication of what each customer can view, record, or schedule.

Figure 5:
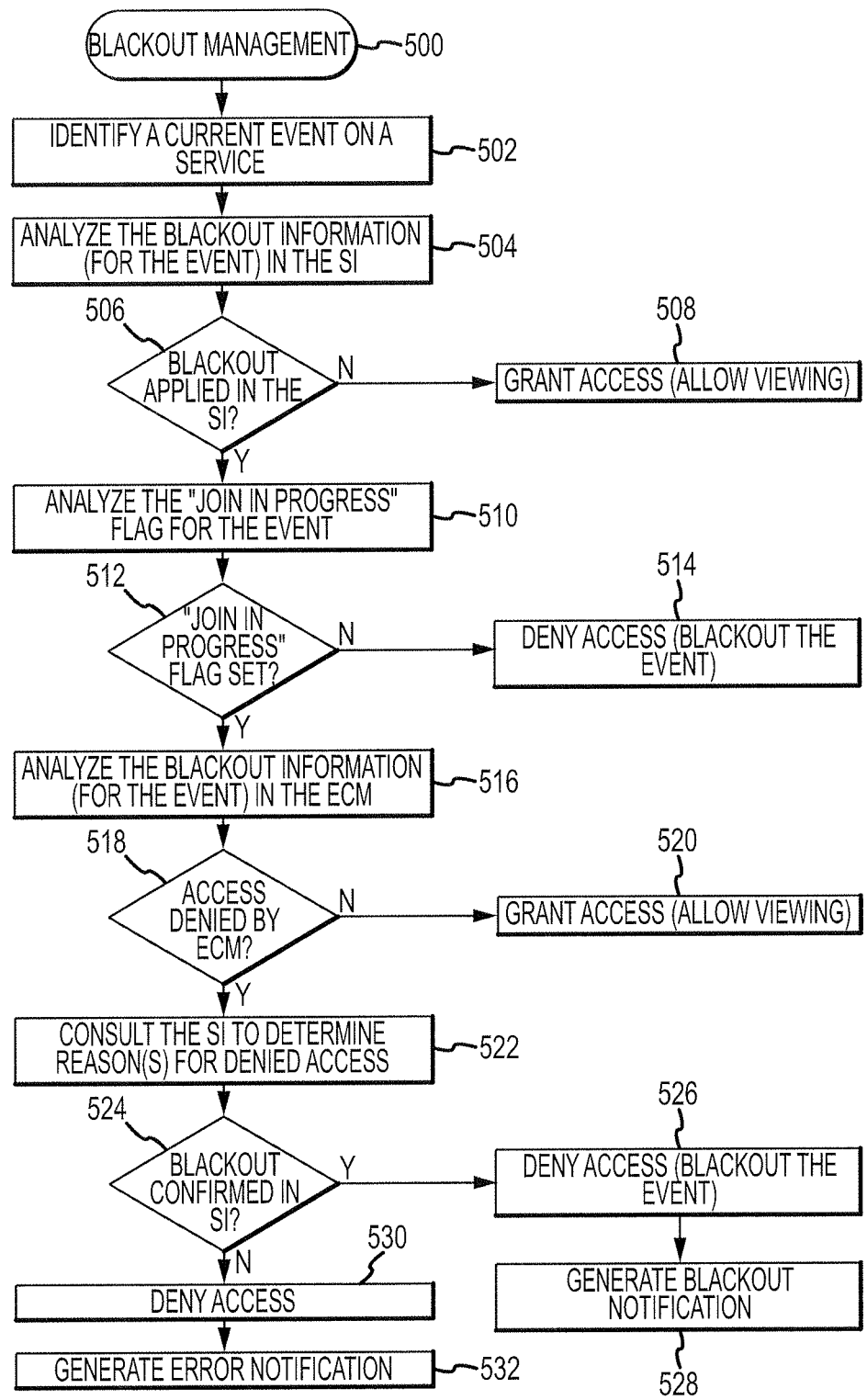
FIG. 5 is a flow diagram of an embodiment of a blackout management process, which may be performed by a set-top box.

FIG. 5 is a flow diagram of an embodiment of a blackout management process 500, which may be performed a video services receiver, such as an STB. Process 500 is performed when the STB receives an access request or command for a current event on a service, and the following description of process 500 is in the context of the user tuning to a current event on a service. However, process 500 (or portions thereof) may also be performed when the STB receives a request or command to set a timer for an event on a service, and/or when the STB is displaying a programming guide or listing of available events. The various tasks performed in connection with process 500 may be performed by software, hardware, firmware, or any combination thereof. For illustrative purposes, the following description of process 500 may refer to elements mentioned above in connection with FIGS. 1-3. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein.

Process 500 may begin by processing an access request for a current event on a service. In this regard, process 500 can identify a current event on a service (task 502), where the user has indicated a desire to view that current event. The above description of set-top box 300 includes a brief summary of how a current event might be identified when tuning to its service. Once the current event has been identified in an appropriate manner, process 500 can analyze the system-wide blackout information for the event (task 504). As described previously, this system-wide blackout information (e.g., a blackout descriptor) can be contained in the SI tables maintained at the STB. For this embodiment, if a blackout for the current event is not applied in the SI tables (query task 506), then process 500 will grant access to the current event (task 508). In other words, if the system-wide blackout information authorizes access to the current event, then the STB will be allowed to decrypt the associated audio/video data for presentation to the user.

If, however, the SI applies a blackout to the current event (query task 506), i.e., the SI indicates that the current event ought to be blacked out, then process 500 proceeds in the following manner. For this embodiment, process 500 analyzes or checks the status of the join-in-progress indicator for the current event (task 510), where the join-in-progress indicator is found in the SI. For purposes of this description, the join-in-progress indicator is implemented as a flag bit, where a first state corresponds to the flag being unset, and a second state corresponds to the flag being set. The join-in-progress flag will be set for the second of two back-to-back events if there is a possibility of the first event running long (i.e., its end time might exceed the scheduled end time). If the second event is not blacked out, then the customer would be authorized to view the second event, regardless of whether the end of the first event extends beyond its normally scheduled end time. Notably, whether or not a given subscriber will be blacked out for an event is usually determined days, if not weeks, in advance of the actual event. Accordingly, the join-in-progress flags for events can be configured and set in the SI well in advance, and the join-in-progress flags will usually remain fixed thereafter.

If the join-in-progress flag is not set (query task 512), then process 500 denies access to the current event (task 514). Denied access results in this situation because the SI indicates that the current event should be blacked out and because the join-in-progress flag indicates that this particular STB is not authorized to view, or even attempt to view, the current event in progress. Under these conditions, process 500 need not consult the service-specific blackout information associated with the ECM.

If the join-in-progress flag is set (query task 512), then process 500 will allow the STB to attempt to tune to the current event. Whether or not the STB will actually be authorized to tune to the current event is influenced by the service-specific blackout information. Accordingly, process 500 analyzes the service-specific blackout information for the current event (task 516), and such analysis of the service-specific blackout information is initiated if the join-in-progress flag is set. In practice, the analysis of the service-specific blackout information represents an analysis of access criteria conveyed in the current ECM associated with the particular service. Again, this service-specific blackout information is updated frequently along with the ECM for the particular service. If access is not denied by the ECM data (query task 518), then process 500 grants access to the current event (task 520) and permits the STB to decrypt the associated audio/video data for presentation to the user. Access is granted in this situation even though the current SI applies a blackout to the current event, because the service-specific blackout information (which represents more frequently updated data) "trumps" the system-wide blackout information.

If, however, the service-specific blackout information prohibits access to the current event (query task 518), then the STB will be denied access to the current event. Denied access results in this situation because the blackout information in both the current SI and the current ECM is reconciled. Under these operating conditions, process 500 can consult the SI to determine the reason(s) for denied access (task 522). If a blackout condition is indeed confirmed in the SI (query task 524), then the STB will take the necessary steps to actually deny access and blackout the current event (task 526). In response to denying access and initiating the blackout, the STB can display an appropriate blackout notification (task 528) on the display to inform the customer. If for some reason the SI does not confirm the blackout condition (query task 524), then the STB will take the necessary steps to deny access (task 530), and process 500 may generate an appropriate error notification (task 532), a general "access denied" message, or the like. In other words, the STB will still deny access to the current event without knowing the specific reasons why.

It should be appreciated that a STB can control access to current events by analyzing the service-specific blackout information in the manner described above. Since the service-specific blackout information can be updated quickly and frequently, controlling access to back-to-back events can be managed on a timeline that more closely resembles real-time control. This approach reduces or eliminates customer confusion and the inconsistent system behavior caused by the latency involved in updating the system-wide SI.

Exemplary Use Cases for Back-To-Back Events

1. User blacked out for Event_1; user not blacked out for Event_2; user tries to set timer for Event_1, which is scheduled for some time in the future. Under this scenario, the blackout descriptor in the SI will be applicable to blackout Event_1. Since Event_1 is not a current event in progress, the STB will not consult the service-specific blackout information in the ECM. Accordingly, the blackout descriptor in the SI will be effective, and the user will be unable to create a timer for Event_1 (due to the blackout of Event_1).

2. User blacked out for Event_1; user not blacked out for Event_2; user tries to set timer for Event_2, which is scheduled for some time in the future. Under this scenario, the blackout descriptor in the SI will be applicable to blackout Event_1 and to authorize access to Event_2. Since Event_2 is not a current event in progress, the STB will not consult the service-specific blackout information in the ECM. Accordingly, the blackout descriptor in the SI will be effective, and the user will be able to create a timer for Event_2 (since there is no blackout of Event_2).

3. User blacked out for Event_1; user not blacked out for Event_2; user tries to tune to Event_1 while Event_1 is in progress. Under this scenario, the blackout descriptor in the SI will be applicable to blackout Event_1. Here, the service-specific blackout information will indicate that the user is blacked out for Event_1. Accordingly, the blackout descriptor in the SI will be effective, and the user will be unable to tune to Event_1.

4. User blacked out for Event_1; user not blacked out for Event_2; user tries to tune to Event_1 while Event_1 is in overtime; the SI at the STB indicates that Event_2 is current. Under this scenario, the join-in-progress flag would be set. Thus, the set-top box would consult the service-specific blackout information in the ECM. Since the ECM would not have blackout information until Event_1 (which is in overtime) has finished, the ECM would allow the user to view Event_1 until the end of overtime. Once Event_1 has finished, blackout information for Event_2 would be applied in the ECM. Since the Event_2 blackout information allows the user to tune to Event_2, that user is still allowed to watch Event_2 after the end of overtime for Event_1.

5. User blacked out for Event_1; user not blacked out for Event_2; user tries to tune to Event_2 after completion of Event__1. Under this scenario, the blackout descriptor in the SI will be applicable to authorize access to Event__2. Accordingly, the blackout descriptor in the SI will be effective, and the user will be able to tune to Event__2.

6. User not blacked out for Event__1; user blacked out for Event__2; user tries to set timer for Event__1, which is scheduled for some time in the future. Under this scenario, the blackout descriptor in the SI will be applicable to authorize access to Event__1. Since Event__1 is not a current event in progress, the STB will not consult the service-specific blackout information in the ECM. Accordingly, the blackout descriptor in the SI will be effective, and the user will be able to create a timer for Event__1 (because the SI does not indicate a blackout of Event__1).

7. User not blacked out for Event__1; user blacked out for Event__2; user tries to set timer for Event__2, which is scheduled for some time in the future. Under this scenario, the blackout descriptor in the SI will be applicable to blackout Event__2. Since Event__2 is not a current event in progress, the STB will not consult the service-specific blackout information in the ECM. Accordingly, the blackout descriptor in the SI will be effective, and the user will not be able to create a timer for Event__2 (due to the blackout of Event__2).

8. User not blacked out for Event__1; user blacked out for Event__2; user tries to tune to Event__1 while Event__1 is in progress. Under this scenario, the blackout descriptor in the SI will be applicable to allow access to Event__1, and the STB need not consult the service-specific blackout information in the ECM. Accordingly, the blackout descriptor in the SI will be effective, and the user will be allowed to tune to Event__1.

9. User not blacked out for Event__1; user blacked out for Event__2; user tries to tune to Event__1 while Event__1 is in overtime; the SI at the STB indicates that Event__2 is current. Under this scenario, the join-in-progress flag would be set. Thus, the set-top box would consult the service-specific blackout information in the ECM. Since the ECM would not have blackout information until Event__1 (which is in overtime) has finished, the ECM would allow the user to view Event__1 until overtime has completed. After Event__1 overtime has finished, blackout information for Event__2 will be applied in the ECM. The ECM will then be decrypted by the set-top box as described above. In this case, access would be denied by the ECM and the set-top box will check the SI to confirm that the user is indeed blacked out. Thus, the set-top box denies access and generates a blackout notification for display.

10. User not blacked out for Event__1; user blacked out for Event__2; user tries to tune to Event__2 after completion of Event__1. Under this scenario, the blackout descriptor in the SI will be applicable to blackout Event__2. Since Event__2 is the current event in progress, the STB will also consult the service-specific blackout information in the ECM. For this example, the service-specific blackout information indicates that the user is blacked out for Event__2. Accordingly, the blackout descriptor in the ECM will be effective, and the user will be unable to tune to Event__2.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of controlling access to back-to-back events by a customer associated with a video services receiver in a system having a plurality of video services receivers for a plurality of customers, wherein the video services receiver is configured to receive video content and to provide the video content to the customer on a display, the method comprising:
receiving system-wide service information (SI) at the video services receiver, the SI being common to all of the plurality of video services receivers in the system, and the SI including system-wide blackout information for events on the service, and the SI including join-in-progress indicators for back-to-back events on the service;
maintaining the system-wide blackout information at the video services receiver;
receiving an entitlement control message (ECM) at the video services receiver, the ECM being specific to the service, and the ECM conveying service-specific blackout information for events on the service that is distinguishable and distinct from the system-wide blackout information;
maintaining the service-specific blackout information at the video services receiver independently and separately from the system-wide blackout information;
identifying a current event on a service;
analyzing the system-wide blackout information for the current event;
granting access to the current event when the system-wide blackout information authorizes access;
checking a join-in-progress indicator for the current event when the system-wide blackout information indicates a blackout for the current event, wherein the SI includes the join-in-progress indicator for the current event;
denying access to the current event when the join-in-progress indicator for the current event is in a first state;
analyzing the service-specific blackout information for the current event when the join-in-progress indicator for the current event is in a second state;
granting access to the current event when the service-specific blackout information authorizes access; and
denying access to the current event when the service-specific blackout information prohibits access.

2. The method of claim 1, wherein:
receiving the system-wide blackout information occurs at a relatively low update rate; and
receiving the service-specific blackout information occurs at a relatively high update rate.

3. The method of claim 1, further comprising displaying a blackout notification on the display in response to denying access to the current event.

4. A video services receiver system for providing video content to a display for viewing by a customer, the system comprising:
a receiver interface configured to receive system-wide service information (SI) that is common to a plurality of video services receivers in a satellite video system, the SI including system-wide blackout information for events on a service provided by the satellite video system, and the SI including join-in-progress indicators for back-to-back events on the service, and the receiver interface configured to receive a program specific information (PSI) table that is specific to only one satellite transponder in the satellite video system, the PSI table conveying service-specific blackout information for events on the service, the service-specific blackout information being distinguishable and distinct from the system-wide blackout information;

a display interface for the display;

at least one memory element configured to store the system-wide blackout information as dated blackout information for events on the service, and to store the service-specific blackout information as frequently updated blackout information for events on the service, wherein the system-wide blackout information and the service-specific blackout information are stored to be distinguishable and distinct from one another; and a processor coupled to the receiver interface, the display interface, and the at least one memory element, the processor being configured to control access to a current event on the service by analyzing the system-wide blackout information, the service-specific blackout information, and the join-in-progress indicators, and the processor being configured to present video content associated with the current event if access is granted;

wherein the processor controls access to the current event by:

granting access to the current event when the system-wide blackout information for the current event authorizes access;

denying access to the current event when (1) the system-wide blackout information for the current event indicates a blackout for the current event, and (2) a join-in-progress indicator for the current event is in a first state;

granting access to the current event when (1) the system-wide blackout information for the current event indicates a blackout for the current event, and (2) the join-in-progress indicator for the current event is in a second state, and (3) the service-specific blackout information for the current event authorizes access; and denying access to the current event when (1) the system-wide blackout information for the current event indicates a blackout for the current event, and (2) the join-in-progress indicator for the current event is in a second state, and (3) the service-specific blackout information for the current event prohibits access.

5. The system of claim 4, wherein the at least one memory element stores the join-in-progress indicator for back-to-back events on the service.

\* \* \* \* \*